Figure 1:
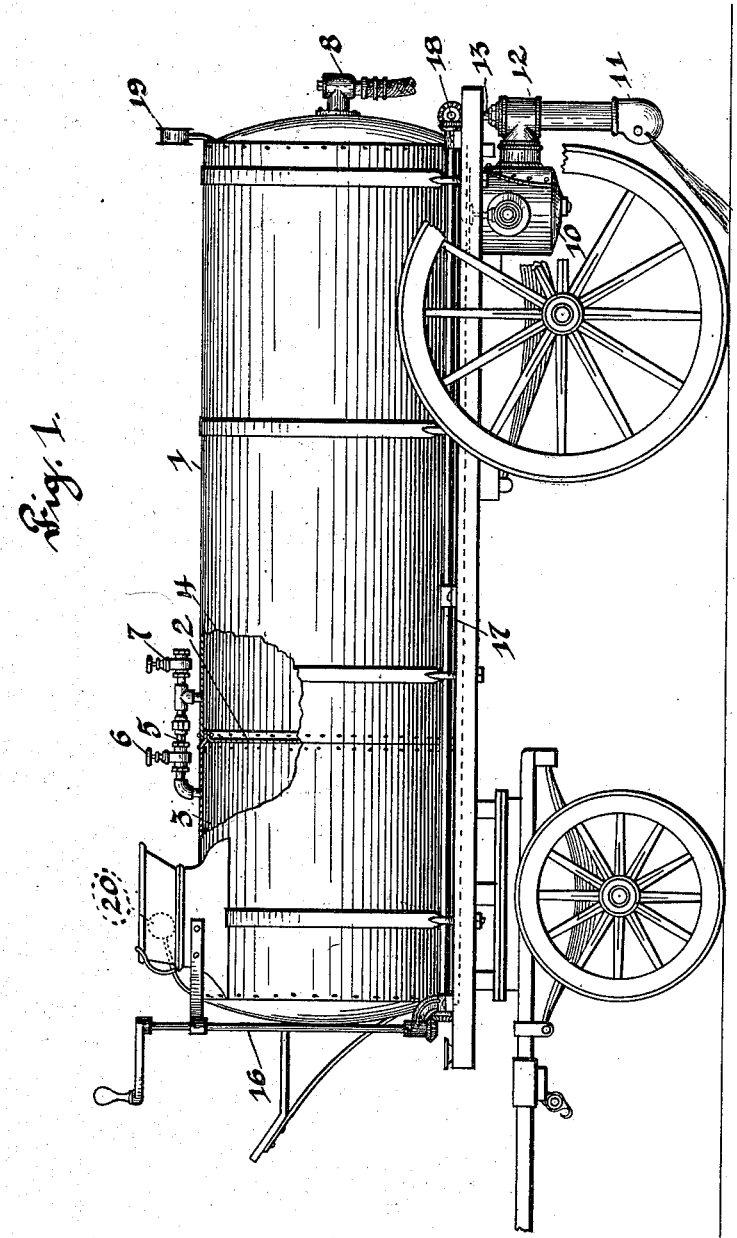

No. 736,135. PATENTED AUG. 11, 1903.
T. M. MURPHY.
STREET WASHER.
APPLICATION FILED JULY 10, 1901.
NO MODEL. 2 SHEETS—SHEET 1.

Witnesses Inventor.
Thos. M. Murphy
By Higdon & Longan Attys.

No. 736,135. PATENTED AUG. 11, 1903.
T. M. MURPHY.
STREET WASHER.
APPLICATION FILED JULY 10, 1901.
NO MODEL. 2 SHEETS—SHEET 2.
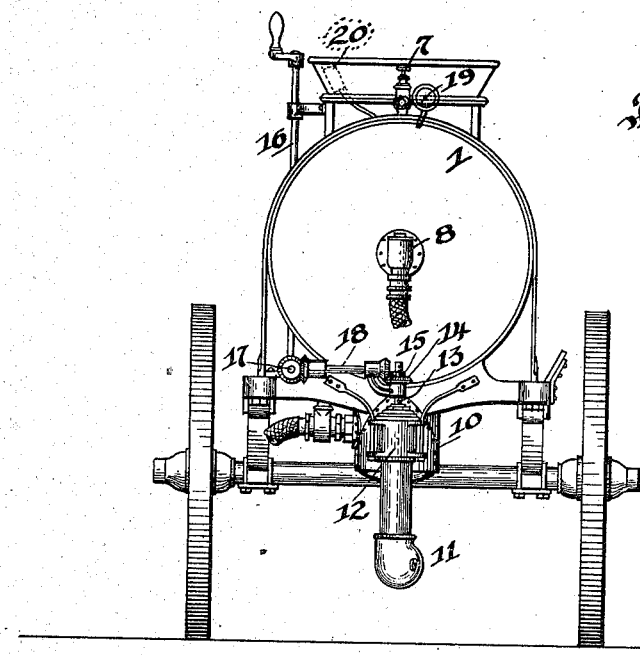
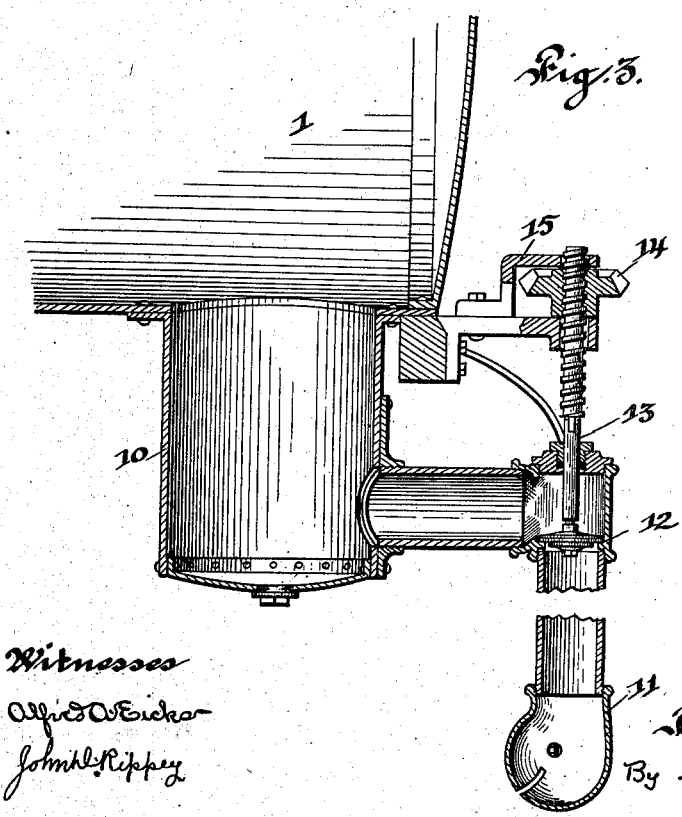
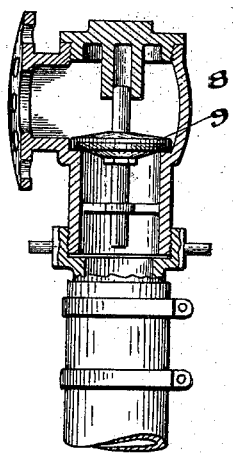

No. 736,135. Patented August 11, 1903.

UNITED STATES PATENT OFFICE.

THOMAS M. MURPHY, OF ST. LOUIS, MISSOURI, ASSIGNOR OF ONE-HALF TO WILLIAM RATICAN, OF ST. LOUIS, MISSOURI.

STREET-WASHER.

SPECIFICATION forming part of Letters Patent No. 736,135, dated August 11, 1903.

Application filed July 10, 1901. Serial No. 67,758. (No model.)

*To all whom it may concern:*

Be it known that I, THOMAS M. MURPHY, of the city of St. Louis, State of Missouri, have invented certain new and useful Improvements in Street-Washers, of which the following is a full, clear, and exact description, reference being had to the accompanying drawings, forming a part hereof.

The invention relates to wheeled street-washers.

The object of the invention is to provide means for enabling the driver or operator of the machine to ascertain the pressure within the machine while it is in motion for the purpose of preventing its reduction below an effective point without leaving his seat or having to turn around in his seat in operating the machine—for instance, in crowded thoroughfares.

The further object of the invention is to provide, in connection with the machine, a sediment-collecting trap for collecting and removing the sediment in a machine of this class, which otherwise would render the operation of the discharge-valve inoperative.

For this purpose my invention consists in the following combination and construction of parts, the details of which will first be fully described and the features of novelty then set forth in the claims.

Various expressions may be given to the inventive act.

In the drawings I have illustrated one method of carrying the invention into effect, it being understood that other mechanical devices may be availed of which come within the scope of the claims.

Figure 1 represents a side elevation of a machine for washing streets to which I have applied my invention. Fig. 2 is an end elevation of the same. Fig. 3 represents in enlarged scale a vertical section of the trap-valve and discharge-nozzle. Fig. 4 is a smaller view showing the valve through which the machine is filled.

In the drawings the machine is shown in this instance comprising a water-tank 1 and an air-tank 3, the two being preferably separated by a head 2, common to both tanks. The water-tank 1 is provided with a trap and water seal 10, the bottom of which is provided with a plug or other opening through which the accumulated sediment may be withdrawn. Extending, preferably, at right angles to the trap 10 is a short pipe leading to the valve 12, which controls the discharge of the tank 1. In the present instance I have shown the valve 12 seated downwardly and below the valve a vertical pipe terminating in a nozzle 11, adapted to discharge the water sidewise or at an angle to the direction of motion of the machine. The valve-stem 13 is provided with a threaded upper extension upon which rotates a bevel-gear 14. The rotation of this gear, through the threaded stem 13, causes the valve 12 to seat or unseat, as desired. The valve-stem 13 and bevel-gear 14 are carried by any suitable supporting device, as 15, attached to the frame of the machine.

The water-tank 1 is filled by means of an inlet-valve 8, in this instance being provided with a check-valve 9, adapted to seat against the outflow of the water and to unseat when the tank is being filled.

The tanks or chambers 1 and 3 are in communication by means of a pipe 5. This pipe 5 is provided with a valve 6, so that communication between the two tanks may be closed when desired. Pipe 5 is also provided with a valve 7, which serves as an air inlet or outlet for either or both tanks 1 and 3 whenever desirable.

The rotation of the gear 14, and with it the operation of the valve 12, is attained by means of a rod 17, mounted upon the vehicle. The rear end of rod 17 carries the bevel-gear 18, which meshes with the gear 14, while the forward end of the rod is provided with another bevel-gear meshing with the bevel-gear upon the vertical staff 16. This staff is provided with an operating-arm within convenient reach of the driver or operator.

The tanks 1 and 3 are preferably mounted upon any suitable vehicle, so as to be movable along the streets.

The trap 10, in addition to the plug through which the sediment is removed, is provided with a lateral manhole controlled by a valve or other removable stop or plug.

Upon the rear of the machine is located a gage 19 in order that the operator when filling the tank may note the pressure within the tank. Alongside of the driver is located a second gage 20, by means of which the operator when driving the machine may note the pressure in either one or both tanks 1 and 3 in order that when the pressure is reduced to or below the point of effective washing of the streets the operator can recharge the tank with the air. This provision prevents the wasteful use of water at a pressure below a point which is necessary for the effective washing of streets under pressure.

The tanks are mounted upon any vehicle capable of transporting them through the streets, adapting it for horse-power, or the machine may be driven by any motor.

It is essential in operating this machine that the driver or the operator may be provided with a pressure-gage which will show the variations of pressure in the tanks without having to leave his seat, turn around, or stop the machine. This provision is carried out by the use of the gage 20, which in this instance is located within the driver's seat, adjacent to the driver. It is also important that a trap be located below the level of the reservoir or tank and between it and the discharge-valve in order to accumulate and remove therefrom the sediment from time to time; otherwise the accumulations therein will in time choke the discharge-valve and render it inoperative.

What I claim as new, and desire to secure by Letters Patent, is—

1. In a street-washing machine, the combination of a movable frame, a water-tank and an air-tank carried thereby having communication with each other, means for regulating the connection between the tanks, an air-inlet for the water-compartment, a water-inlet, a discharge-valve, a trap interposed between the tank and the discharge-valve provided with a sediment-chamber having an opening for cleaning the same and extending below the tank and the discharge-valve.

2. In a street-washing machine, the combination of a movable frame, a water-tank and an air-tank carried thereby having communication with each other, means for regulating the connection between the tanks, an air-inlet for the water-compartment, a water-inlet, a discharge-valve, a trap interposed between the tank and the discharge-valve provided with a sediment-chamber having an opening for cleaning the same and extending below the tank and the discharge-valve, and means for controlling the discharge-valve located alongside the driver's seat.

3. In a street-washing machine, the combination of a movable frame, a water-tank and an air-tank carried thereby having communication with each other, means for regulating the connection between the tanks, an air-inlet for the water-compartment, a water-inlet, a discharge-valve, a trap interposed between the tank and the discharge-valve provided with a sediment-chamber extending below the tank and the discharge-valve and having an opening for cleaning the same, means for controlling the discharge-valve located alongside the driver's seat, and a pressure-gage located in the same position.

In testimony whereof I affix my signature in presence of two witnesses.

THOMAS M. MURPHY.

Witnesses:
ALFRED O. EICKS,
JOHN C. HIGDON.